United States Patent
Singh et al.

(10) Patent No.: US 9,226,102 B1
(45) Date of Patent: Dec. 29, 2015

(54) METHOD FOR RE-ENABLING AGGREGATION AFTER BLUETOOTH SESSION

(71) Applicant: QUALCOMM Incorporated, San Diego, CA (US)

(72) Inventors: Abhishek Sukhbirsing Singh, Hyderabad (IN); Ravi Kumar Sharma, Hyderabad (IN); Deepak Kumar, Hyderabad (IN); Sachin Ahuja, Hyderabad (IN); Mukul Sharma, Hyderabad (IN); Ramesh Naik, Hyderabad (IN); Ganesh Babu Kumaravel, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/552,119

(22) Filed: Nov. 24, 2014

(51) Int. Cl.
*H04W 4/00* (2009.01)
*H04W 76/02* (2009.01)
*H04M 1/725* (2006.01)

(52) U.S. Cl.
CPC ............ *H04W 4/008* (2013.01); *H04M 1/7253* (2013.01); *H04W 76/023* (2013.01)

(58) Field of Classification Search
CPC .................................................. H04W 4/008
See application file for complete search history.

(56) References Cited

U.S. PATENT DOCUMENTS

| | | | | |
|---|---|---|---|---|
| 2009/0067396 | A1* | 3/2009 | Fischer | H04L 1/1854 370/338 |
| 2011/0261735 | A1* | 10/2011 | Cordeiro | H04L 5/001 370/310 |
| 2012/0113879 | A1 | 5/2012 | Aoki | |
| 2014/0119186 | A1* | 5/2014 | Wong | H04W 28/02 370/235 |
| 2014/0213273 | A1 | 7/2014 | Xie et al. | |
| 2014/0241226 | A1 | 8/2014 | Jia et al. | |
| 2014/0254349 | A1* | 9/2014 | Jia | H04W 28/04 370/225 |
| 2014/0269478 | A1 | 9/2014 | Choi et al. | |
| 2014/0293889 | A1 | 10/2014 | Mahr et al. | |
| 2014/0302787 | A1* | 10/2014 | Rantala | H04W 4/008 455/41.2 |
| 2014/0321317 | A1* | 10/2014 | Kasslin | H04W 4/08 370/254 |
| 2014/0351832 | A1* | 11/2014 | Cho | H04L 67/141 719/328 |

OTHER PUBLICATIONS

Kavuri S., "Wi-Fi Notebook—11n Block Acknowledgement", http://80211notes.blogspot.com/, 21 pages, printed from world wide web on Aug. 25, 2014.

* cited by examiner

*Primary Examiner* — David Bilodeau
(74) *Attorney, Agent, or Firm* — Mahamedi Paradice LLP (57) ABSTRACT

In a wireless network, a first wireless device may send a first frame instructing a second wireless device to suspend a block acknowledgement session while the first wireless device is facilitating a Bluetooth operation. When the Bluetooth operation is complete, the first wireless device may send a second frame instructing the second wireless device to resume the block acknowledgement session.

20 Claims, 8 Drawing Sheets

METHOD FOR RE-ENABLING AGGREGATION AFTER BLUETOOTH SESSION

TECHNICAL FIELD

The present embodiments relate generally to wireless networks, and specifically block acknowledgment sessions in wireless networks.

BACKGROUND OF RELATED ART

A wireless local area network (WLAN) may be formed by one or more access points (APs) that provide a shared wireless communication medium for use by a number of client devices or stations (STAs). Each AP, which may correspond to a Basic Service Set (BSS), periodically broadcasts beacon frames to enable any STAs within wireless range of the AP to establish and/or maintain a communication link with the WLAN. Once a STA is associated with the AP, the AP and the STA may exchange data frames. When the STA receives a data frame from the AP, the STA is to transmit an acknowledgment (ACK) frame back to the AP to acknowledge receipt of the data frame.

A block acknowledgement (BA) session may allow the STA to acknowledge receipt of multiple data frames using a single ACK frame. More specifically, the STA may use a block acknowledgment frame to acknowledge receipt of a plurality of data frames and/or a number of aggregated data frames (e.g., rather than confirming receipt of each data frame with a corresponding ACK frame). In this manner, the BA session may reduce the number of ACK frames transmitted to the AP, which in turn may reduce congestion of the wireless medium.

Because Bluetooth (BT) and some Wi-Fi signals are transmitted at similar frequencies (e.g., in the ISM band, centered at approximately 2.4 GHz), it is desirable for STAs that include both BT and Wi-Fi transceivers to minimize interference between the BT and Wi-Fi signals. For example, when a STA is facilitating a Synchronous Connection Oriented (SCO) call via a BT link to a headset, the STA may terminate the BA session so that an AP (or other transmitting device) stops transmitting aggregated data frames to the STA. When the SCO call is terminated, and thus there is a reduced interference between BT and Wi-Fi signals, it would be desirable for the STA to restart the BA session and resume the transmission of aggregated data frames. Unfortunately, current provisions of the IEEE 802.11 standards do not provide a mechanism for the STA to restart the BA session.

Thus, it would be desirable for the STA (or other receiving device) to restart the BA session after a BT operation of the STA is completed.

BRIEF DESCRIPTION OF THE DRAWINGS

The present embodiments are illustrated by way of example and are not intended to be limited by the figures of the accompanying drawings, where like reference numerals refer to corresponding parts throughout the drawing figures.

DETAILED DESCRIPTION

The present embodiments are described below in the context of data exchanges between Wi-Fi enabled devices for simplicity only. It is to be understood that the present embodiments are equally applicable to data exchanges using signals of other various wireless standards or protocols. As used herein, the terms "WLAN" and "Wi-Fi" can include communications governed by the IEEE 802.11 family of standards, Bluetooth, HiperLAN (a set of wireless standards, comparable to the IEEE 802.11 standards, used primarily in Europe), and other technologies having relatively short radio propagation range. In addition, although described herein in terms of exchanging data frames between wireless devices, the present embodiments may be applied to the exchange of any data unit, packet, and/or frame between wireless devices. Thus, the term "data frame" may include any frame, packet, or data unit such as, for example, protocol data units (PDUs), MAC protocol data units (MPDUs), and physical layer convergence procedure protocol data units (PPDUs). The term "A-MPDU" may refer to aggregated MPDUs.

In the following description, numerous specific details are set forth such as examples of specific components, circuits, and processes to provide a thorough understanding of the present disclosure. The term "coupled" as used herein means connected directly to or connected through one or more intervening components or circuits. Also, in the following description and for purposes of explanation, specific nomenclature is set forth to provide a thorough understanding of the present embodiments. However, it will be apparent to one skilled in the art that these specific details may not be required to practice the present embodiments. In other instances, well-known circuits and devices are shown in block diagram form to avoid obscuring the present disclosure. The present embodiments are not to be construed as limited to specific examples described herein but rather to include within their scopes all embodiments defined by the appended claims.

As mentioned above, current Wi-Fi standards allow wireless devices (e.g., STAs and/or APs) to acknowledge multiple data frames or aggregated data frames using a single block acknowledgement frame. More specifically, the IEEE 802.11e standards may improve efficiency of the wireless medium by allowing a receiving device to confirm receipt of a plurality of frames from a transmitting device using a single block ACK frame. As a result, the transmitting device may continuously transmit a plurality of frames (rather than waiting for an ACK frame every time one data frame is transmitted to the receiving device). In addition, the IEEE 802.11n standards support frame aggregation, which allows the transmitting device to aggregate a plurality of MAC frames into an A-MPDU frame and then transmit the A-MPDU frame at higher transmission rates. The receiving device may use a block ACK frame to confirm receipt of each of the aggregated frames transmitted within the A-MPDU frame.

Before a pair of wireless devices may use block ACK frames to confirm receipt of each other's data transmissions, the wireless devices first enter a block acknowledgement setup phase during which capability information (e.g., buffer size and block acknowledgement policies) are negotiated with each other. Once the setup phase is completed, the wireless devices may then send multiple frames to each other without waiting for individual ACK frames; instead, the receiving device may acknowledge receipt of a plurality of data frames using a single block ACK frame. The block acknowledgement agreement may be torn down (e.g., terminated) by sending a Delete Block Acknowledgment (DELBA) frame to the other wireless device.

Figure 1A:
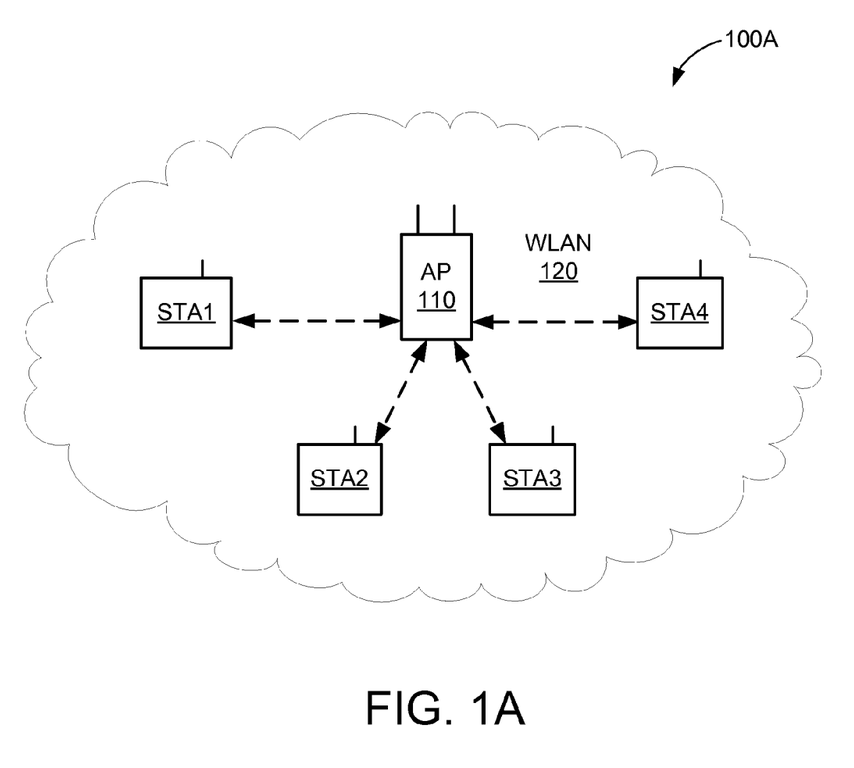
FIG. 1A shows a block diagram of a wireless system including an infrastructure mode WLAN within which the present embodiments may be implemented.

FIG. 1A is a block diagram of a wireless network system 100A within which the present embodiments may be implemented. The system 100A is shown to include four wireless stations STA1-STA4, a wireless access point (AP) 110, and a wireless local area network (WLAN) 120. The WLAN 120 may be formed by a plurality of Wi-Fi access points (APs) that may operate according to the IEEE 802.11 family of standards (or according to other suitable wireless protocols). Thus, although only one AP 110 is shown in FIG. 1A for simplicity, it is to be understood that WLAN 120 may be formed by any number of access points such as AP 110. The AP 110 is assigned a unique MAC address that is programmed therein by, for example, the manufacturer of the access point. Similarly, each of STA1-STA4 is also assigned a unique MAC address.

The stations STA1-STA4 may be any suitable Wi-Fi enabled wireless devices including, for example, cell phones, personal digital assistants (PDAs), tablet devices, laptop computers, or the like. For at least some embodiments, stations STA1-STA4 may include a transceiver, one or more processing resources (e.g., processors and/or ASICs), one or more memory resources, and a power source (e.g., a battery). The memory resources may include a non-transitory computer-readable medium (e.g., one or more nonvolatile memory elements, such as EPROM, EEPROM, Flash memory, a hard drive, etc.) that stores instructions for performing operations described below with respect to FIGS. 5A, 5B, and 6.

The AP 110 may be any suitable device that allows one or more wireless devices to connect to a network (e.g., a local area network (LAN), wide area network (WAN), metropolitan area network (MAN), and/or the Internet) via AP 110 using Wi-Fi, Bluetooth, or any other suitable wireless communication standards. For at least one embodiment, AP 110 may include a transceiver, a network interface, one or more processing resources, and one or more memory sources. The memory resources may include a non-transitory computer-readable medium (e.g., one or more nonvolatile memory elements, such as EPROM, EEPROM, Flash memory, a hard drive, etc.) that stores instructions for performing operations described below with respect to FIGS. 5A, 5B, and 6.

Figure 1B:
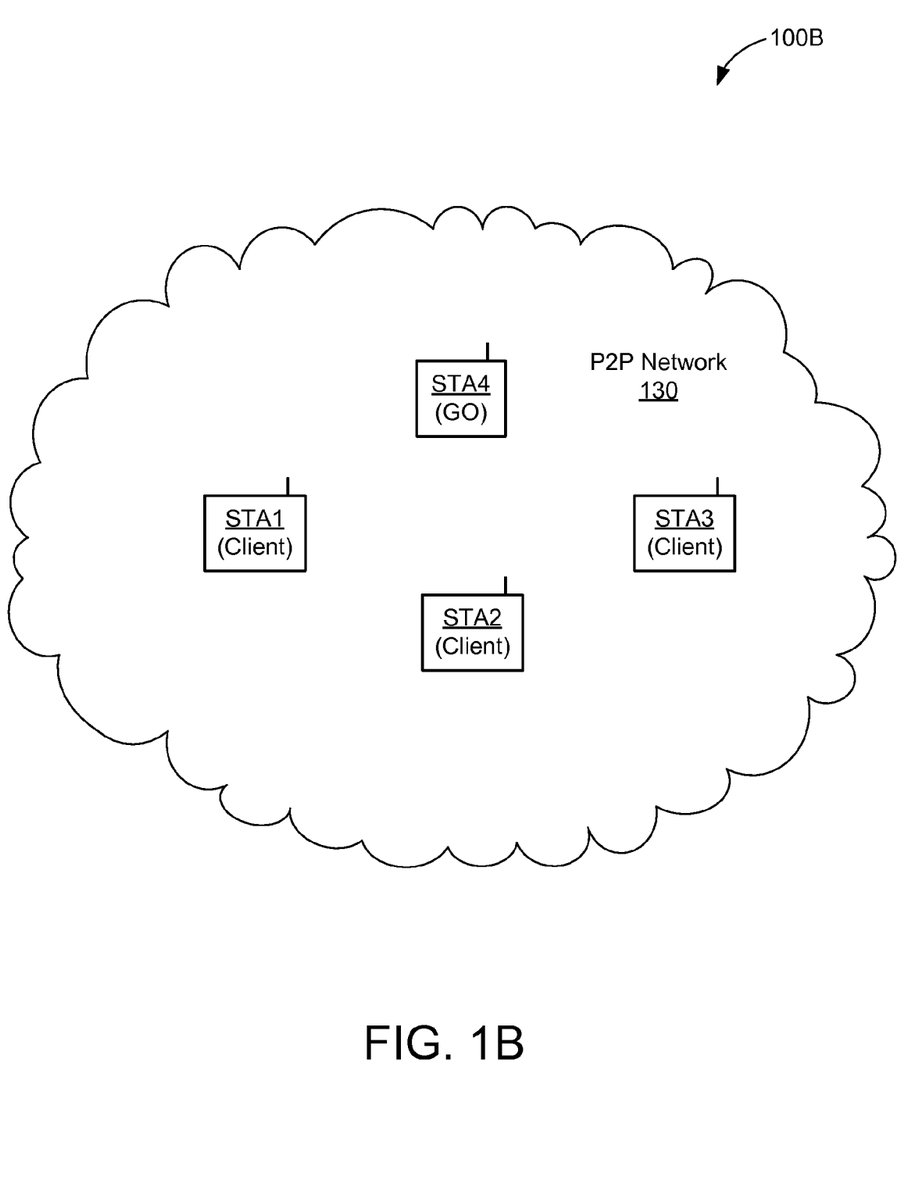
FIG. 1B shows a block diagram of a wireless system including an ad-hoc or peer-to-peer (P2P) WLAN within which the present embodiments may be implemented.

FIG. 1B is a block diagram of another wireless network system 100B within which the present embodiments may be implemented. The system 100B is shown to include four wireless stations STA1-STA4 associated with a peer-to-peer (P2P) network 130. The P2P network, which may also be referred to as an ad-hoc network, an independent basic service set (IBSS) network, or a Wi-Fi Direct network, may operate according to the IEEE 802.11 family of standards (or according to other suitable wireless protocols). For the example P2P network 130 of FIG. 1B, station STA4 is designated as the Group Owner (GO), and stations STA1-STA3 are designated as P2P clients. As the GO, STA4 may serve as a gateway for the P2P clients (e.g., to another network), and perform many of the functions as the AP 110 of FIG. 1A including, for example, setting up and tearing down the P2P network 130, admitting new members to the P2P network 130, broadcasting beacon frames, and so on.

Figure 2:
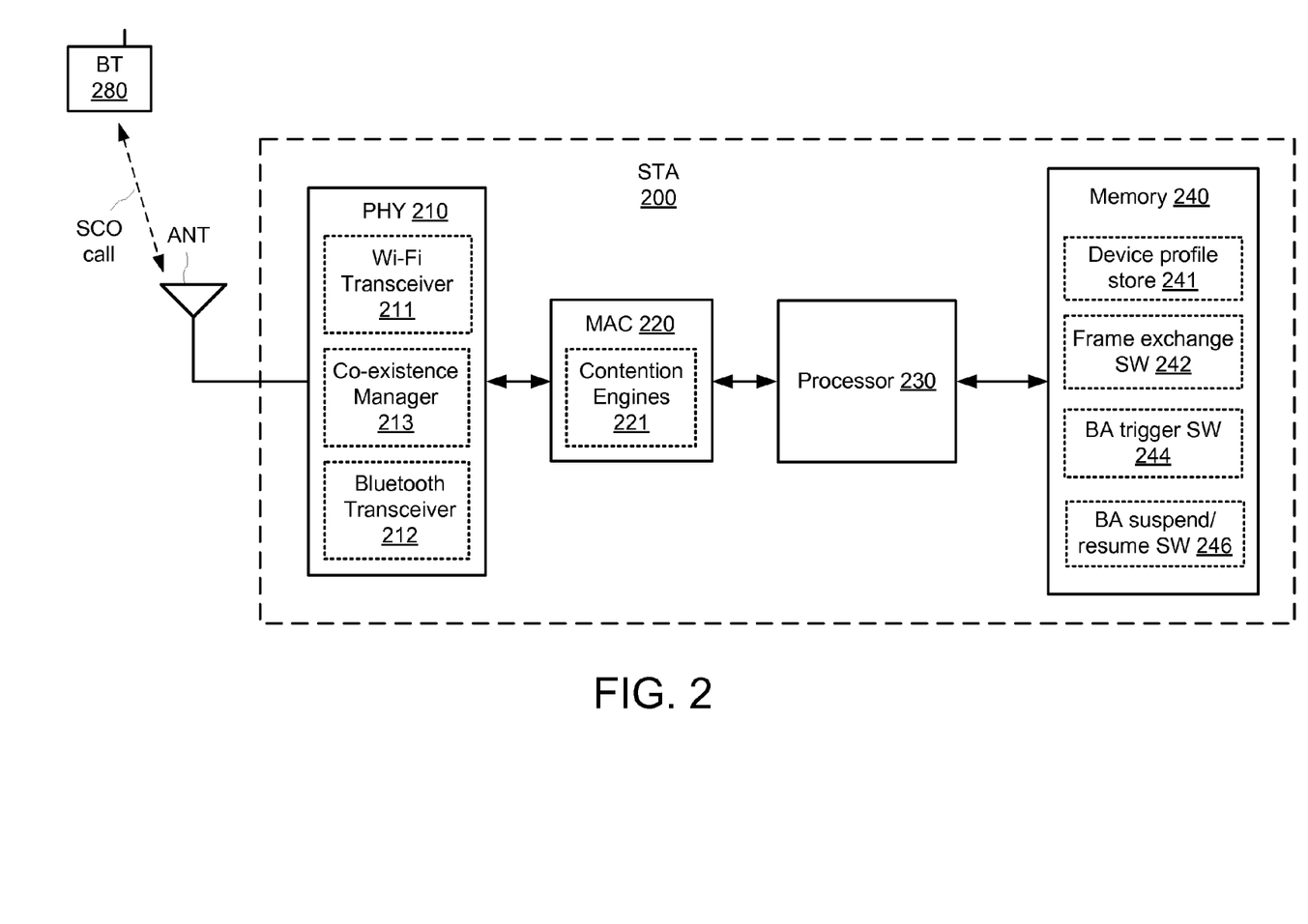
FIG. 2 shows a block diagram of a wireless station (STA) in accordance with some embodiments.

FIG. 2 shows a STA 200 that is one embodiment of at least one of the stations STA1-STA4 of FIGS. 1A and 1B. The STA 200 may include a PHY device 210, a MAC device 220, a processor 230, and a memory 240. The PHY device 210 may include at least a Wi-Fi transceiver 211, a Bluetooth (BT) transceiver 212, and a co-existence manager 213. The MAC device 220 may include at least a number of contention engines 221. The Wi-Fi transceiver 211 may be used to transmit signals to and receive signals from AP 110 via an antenna ANT (see also FIG. 1), and may be used to scan the surrounding environment to detect and identify nearby access points (e.g., access points within range of STA 200) and/or other STAs. The BT transceiver 212 may be used to transmit BT signals to and receive signals via antenna ANT from a BT accessory device 280 (e.g., which may be an audio headsets, wireless speakers, a wireless printer, and so on), may be used to scan the surrounding environment to detect and identify other devices with which to pair. Although only one antenna is shown in FIG. 2 for simplicity, for actual embodiments, STA 200 may include any number of antennas, for example, to provide multiple-input multiple-output (MIMO) functionality.

The co-existence manager 213, which is coupled to both the Wi-Fi transceiver 211 and the BT transceiver 212, may coordinate the transmission/reception of Wi-Fi signals with the transmission/reception of BT signals, for example, to reduce interference between the Wi-Fi signals and the BT signals. For some embodiments, the co-existence manager 213 may receive transmit/receive information from the Wi-Fi transceiver 211 and/or the BT transceiver 212. For other embodiments, the co-existence manager 213 may receive Wi-Fi and/or BT transmit/receive information from processor 230.

For purposes of discussion herein, MAC device 220 is shown in FIG. 2 as being coupled between PHY device 210 and processor 230. For actual embodiments, PHY device 210, MAC device 220, processor 230, and/or memory 240 may be connected together using one or more buses (not shown for simplicity). Further, although the co-existence manager 213 is shown in FIG. 2 as part of PHY 210, for other embodiments, the co-existence manager 213 may be included within other portions of STA 200 (e.g., in processor 230), or may be a separate component (e.g., a software module stored in memory 240).

The contention engines 221 may contend for access to the shared wireless medium, and may also store packets for transmission over the shared wireless medium. The STA 200 may include one or more contention engines 221 for each of the plurality of different access categories. For other embodiments, the contention engines 221 may be separate from MAC device 220. For still other embodiments, the contention engines 221 may be implemented as one or more software modules (e.g., stored in memory 240 or stored in memory provided within MAC device 220) containing instructions that, when executed by processor 230, perform the functions of contention engines 221.

Memory 240 may include a profile data store 241 that stores profile information for a plurality of devices such as APs and/or other STAs. The profile information for a particular device may include information including, for example, the device's SSID, channel information, RSSI values, supported data rates, BA session information, BA suspend and resume codes, and any other suitable information pertaining to or describing the operation of the device.

Further, although not shown for simplicity, memory 240 may include a medium access parameters table and a number of packet queues. The medium access parameters table may store a number of medium access parameters including, for example, transmission schedules, contention windows, contention window sizes, back-off periods, random back-off numbers, and/or other information associated with contending for and/or controlling access to the wireless medium of the WLAN 120 of FIG. 1A and/or the P2P network 130 of FIG. 1B. The packet queues may store packets to be transmitted from STA 200 to an associated AP (or other STAs). For some embodiments, the memory 240 may include one or more packet queues for each of a plurality of different priority levels or access categories.

Figure 5A:
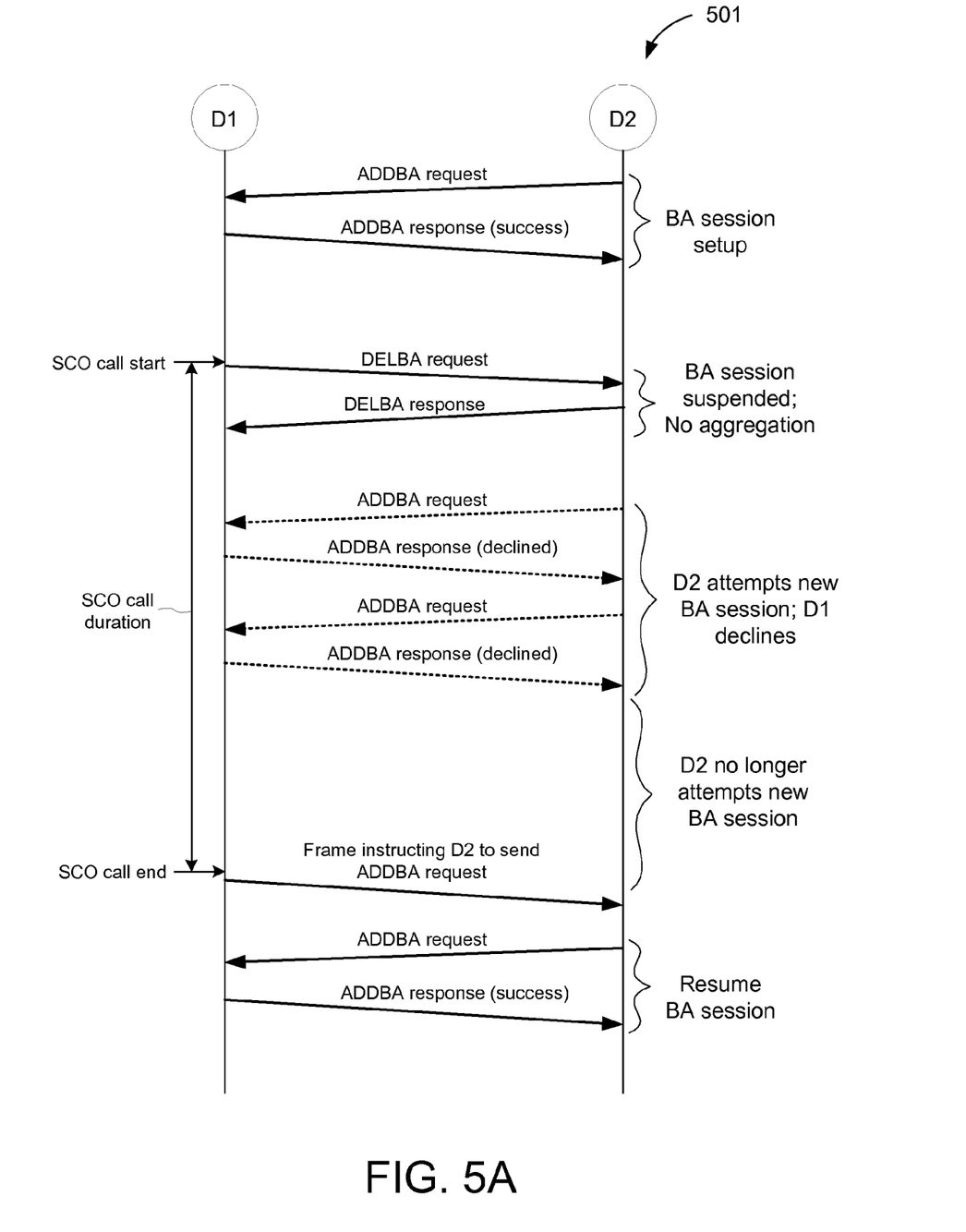
FIG. 5A is a sequence diagram depicting an example operation for re-starting a block acknowledgement session in accordance with some embodiments.
Figure 5B:
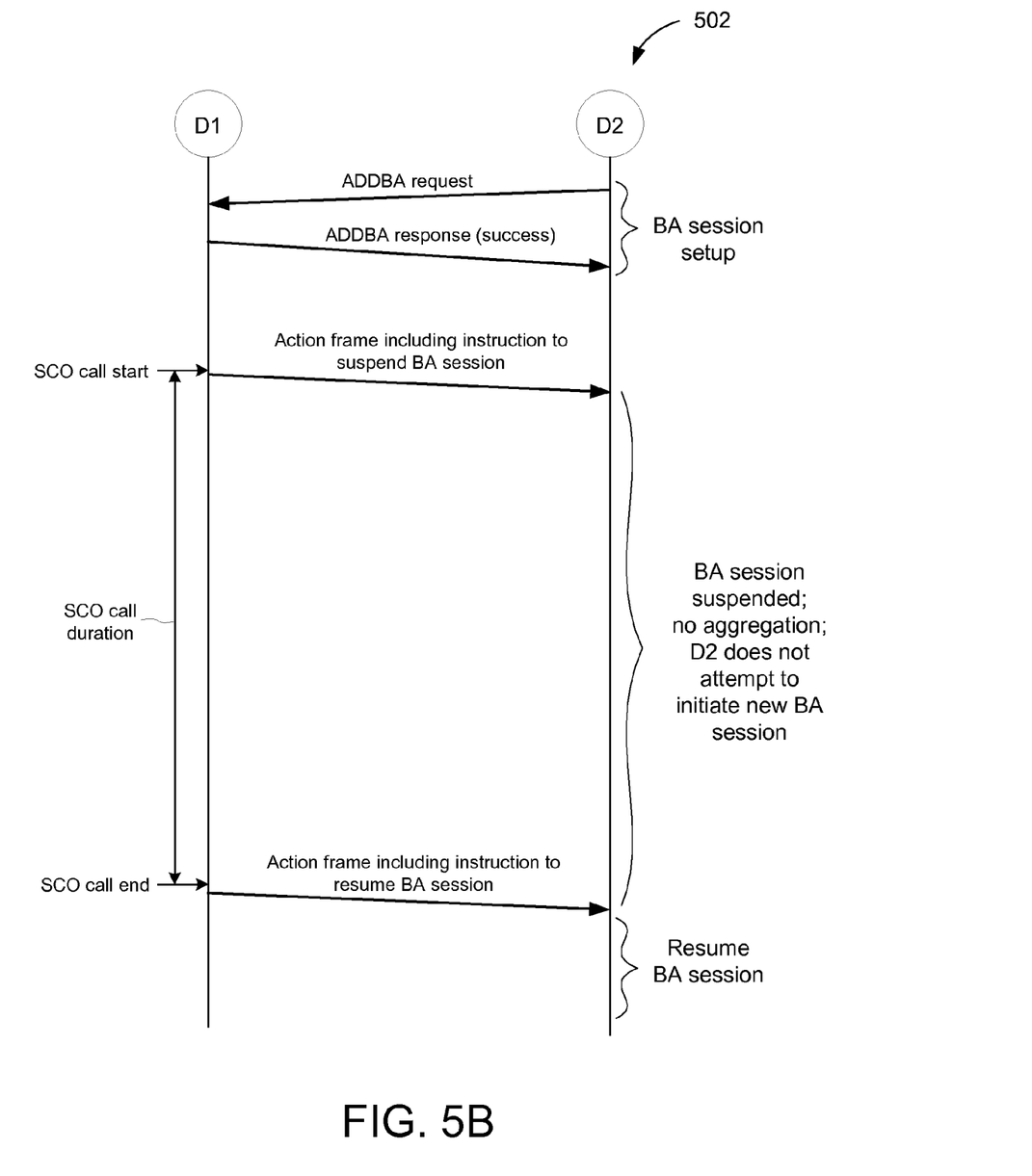
FIG. 5B is a sequence diagram depicting an example operation for re-starting a block acknowledgement session in accordance with other embodiments.
Figure 6:
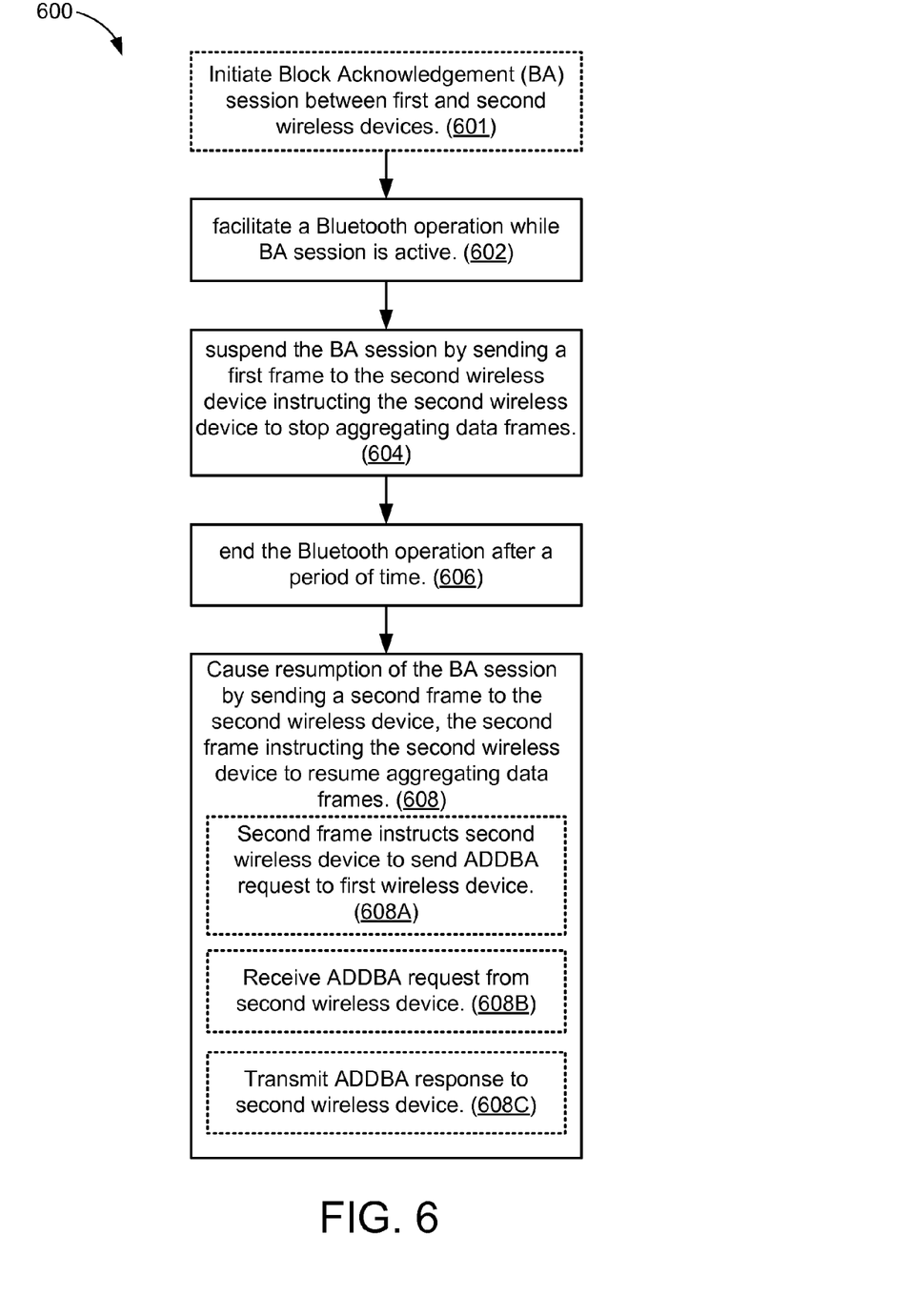
FIG. 6 is an illustrative flow chart depicting an example operation for suspending and resuming of a block acknowledgement session in accordance with some embodiments.

Memory 240 may also include a non-transitory computer-readable medium (e.g., one or more nonvolatile memory elements, such as EPROM, EEPROM, Flash memory, a hard drive, and so on) that can store the following software modules:

- a frame exchange software module 242 to facilitate the exchange of frames (e.g., ADDBA requests, ADDBA responses, DELBA frames, action frames, management frames, data frames, ACK frames, probe requests, beacon frames, association frames, control frames, and so on), for example, as described for operations of FIGS. 5A, 5B, and 6;
- a block acknowledgement (BA) trigger software module 244 to send frames to another device (e.g., an AP or another STA) that cause or instruct a BA session to be terminated or suspended (e.g., in response to the STA facilitating a Bluetooth operation such as a SCO call with BT device 280) and/or that cause or instruct a BA session to be restarted or resumed (e.g., in response to termination of the Bluetooth operation), for example, as described for operations of FIGS. 5A, 5B, and 6;
- a block acknowledgement (BA) suspend/resume software module 246 to receive frames from another device instructing STA 200 to suspend or resume a BA session, and to send frames to another device to suspend or resume the BA session, for example, as described for operations of FIGS. 5A, 5B, and 6.

Each software module includes instructions that, when executed by processor 230, cause STA 200 to perform the corresponding functions. The non-transitory computer-readable medium of memory 240 thus includes instructions for performing all or a portion of the operations depicted in FIGS. 5A, 5B, and 6.

Processor 230, which is shown in the example of FIG. 2 as coupled to PHY device 210 and transceiver 211, to MAC device 220 and contention engines 221, and to memory 240, may be any suitable processor capable of executing scripts or instructions of one or more software programs stored in STA 200 (e.g., within memory 240). For example, processor 230 may execute frame exchange software module 242 to facilitate the exchange of frames (e.g., ADDBA requests, ADDBA responses, DELBA frames, action frames, management frames, data frames, ACK frames, probe requests, beacon frames, association frames, control frames, and so on). Processor 230 may also execute block acknowledgement (BA) trigger software module 244 to send frames to another device (e.g., an AP or another STA) that cause or instruct a BA session to be terminated or suspended (e.g., in response to the STA facilitating a Bluetooth operation such as a SCO call) and/or that cause or instruct a BA session to be restarted or resumed (e.g., in response to termination of the Bluetooth operation). Processor 230 may also execute block acknowledgement (BA) suspend/resume software module 246 to receive frames from another device instructing STA 200 to suspend or resume a BA session, and to send frames to another device to suspend or resume the BA session.

Figures 3A, 3B:
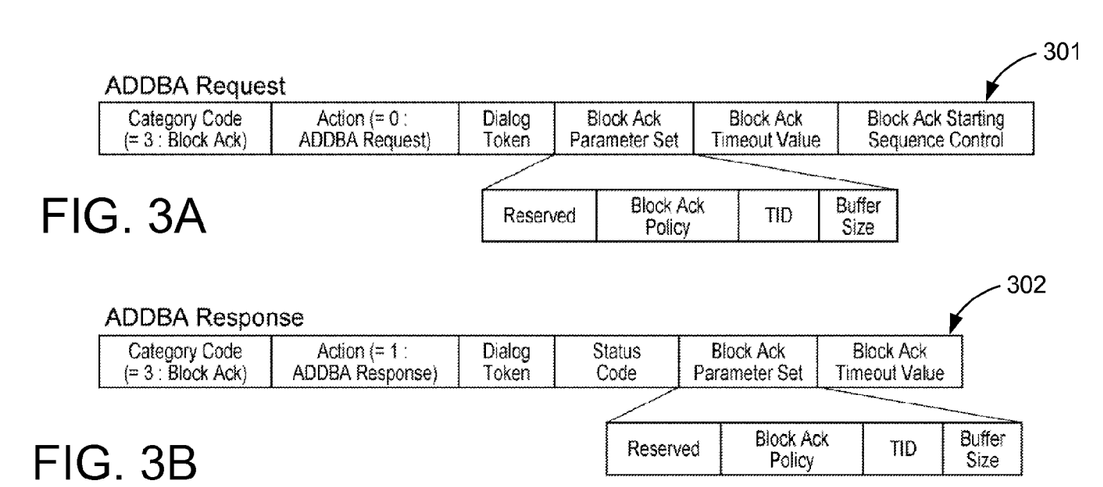
FIG. 3A shows an example frame format of an ADDBA request frame in accordance with some embodiments.
FIG. 3B shows an example frame format of an ADDBA response frame in accordance with some embodiments.

As mentioned above, the IEEE 802 standards allow wireless devices to acknowledge receipt of multiple data frames using a single block ACK frame. For example, referring to FIG. 1A, the AP 110 may initiate a block ACK session with STA1 by transmitting an add block acknowledgment (ADDBA) request to STA1. The ADDBA request is an action frame defined in the IEEE 802.11e standards, and typically has frame format 301 as depicted in FIG. 3A. Upon receiving ADDBA request, STA1 may transmit an ADDBA response back to the AP 110. The ADDBA response is an action frame defined in the IEEE 802.11e standards, and typically has frame format 302 as depicted in FIG. 3B. The STA1 may indicate acceptance of the ADDBA request by setting the Status Code to "success" in the ADDBA response, and may indicate denial of the ADDBA request by setting the Status Code to "declined" in the ADDBA response.

Once the ADDBA request and the ADDBA response indicating "success" are exchanged, the BA session is established, and the AP 110 may thereafter transmit aggregated data frames to STA1, and STA1 may confirm receipt of the aggregated data frames using a single block ACK frame. The AP 110 and STA1 may store BA session information that includes, for example, buffer sizes, BA policies, status of the BA session, and so on.

Figure 3C:
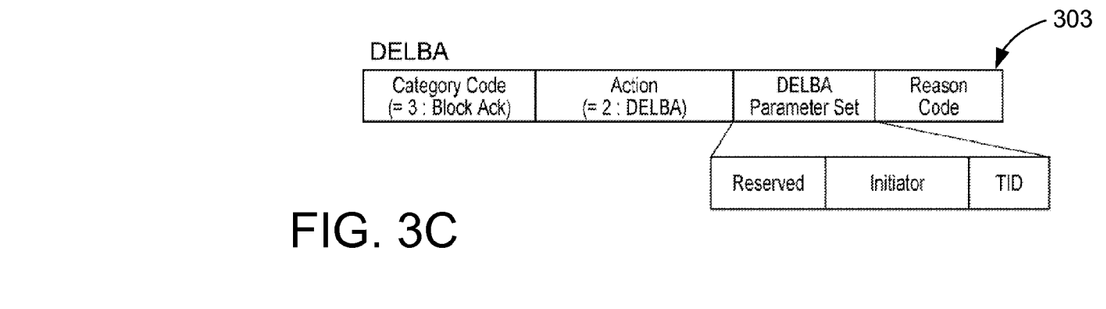
FIG. 3C shows an example frame format of a DELBA frame in accordance with some embodiments.

When STA1 wants to end the BA session (e.g., because STA1 commences a SCO call via a BT headset and wants to minimize interference between BT and Wi-Fi signals), STA1 may transmit a DELBA frame to the AP 110. The DELBA frame is an action frame defined in the IEEE 802.11e standards, and typically has frame format 303 as depicted in FIG. 3C. Upon receiving the DELBA frame, the AP 110 may tear-down the BA session, and thereafter stop aggregating data frames for transmission to STA1.

During the SCO call facilitated by STA1, the AP 110 may not be able to establish (or re-establish) the BA session. For example, while STA1 is conducting the SCO call, the AP 110 may continue sending ADDBA requests to STA1 in an attempt to establish a new BA session with STA1. However, because STA1 is using its BT transceiver 212 to facilitate the SCO call, the STA's co-existence manager 213 may cause STA1 to reject the ADDBA requests (e.g., by transmitting ADDBA responses containing a status code set to "decline"), thereby reducing interference of the BT signals by reducing incoming Wi-Fi traffic to STA1.

When the SCO call facilitated by STA1 is completed, and thus STA1 is again able to receive aggregated data frames from the AP 110, the STA1 does not, at present, have any mechanism to restart the BA session. Although the AP 110 may restart the BA session, repeated ADDBA request rejections from the STA1 may cause the AP 110 to stop attempting to start a new BA session (e.g., the AP 110 may stop attempting to start new BA sessions after a number of prior "rejections" from STA1). This scenario is depicted in the sequence diagram 400 of FIG. 4.

Figure 4:
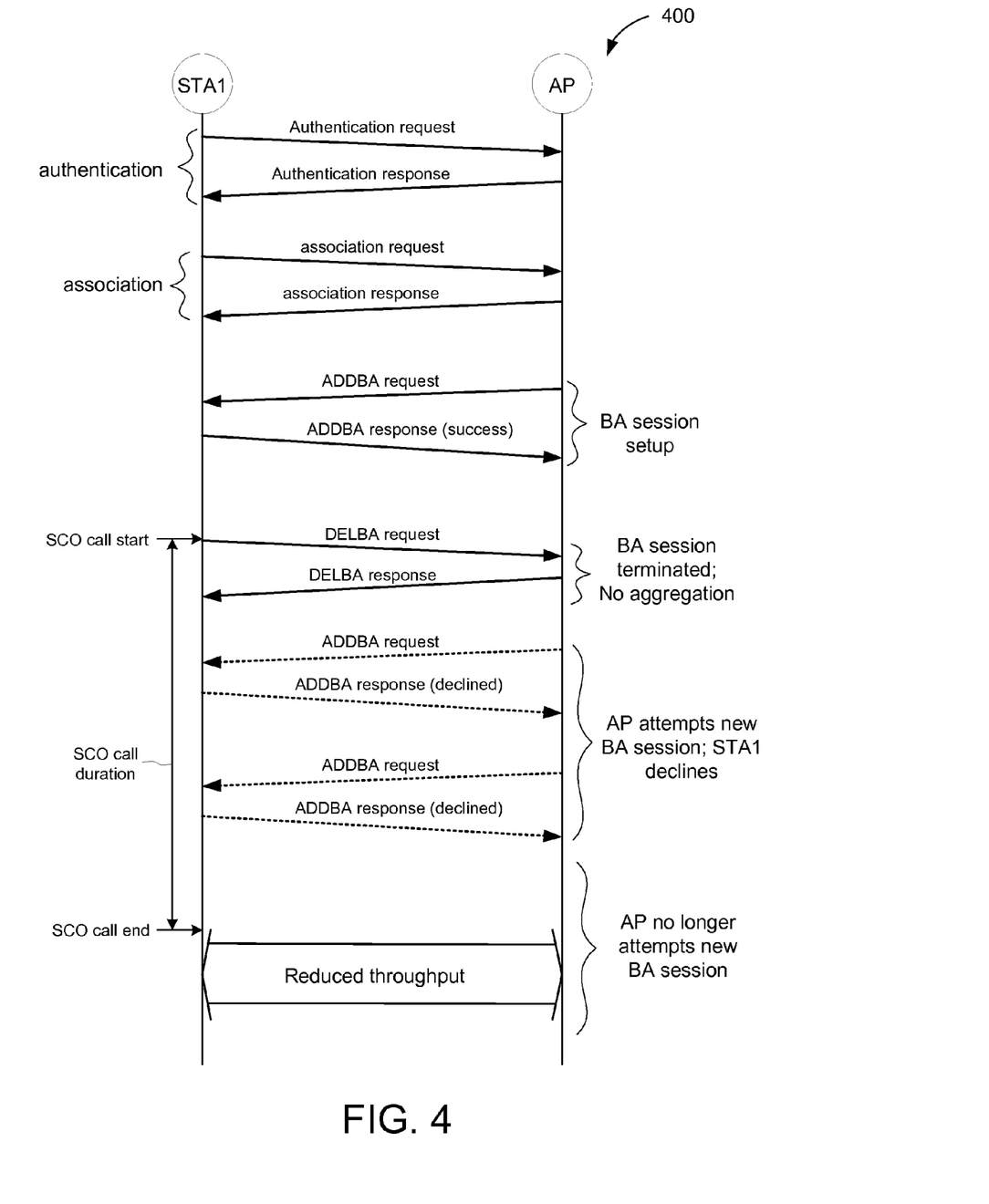
FIG. 4 is a sequence diagram depicting an example operation for establishing a connection between a STA and an AP and an example operation for initiating and tearing down a block acknowledgement session between the STA and the AP.

Referring now to FIG. 4, STA1 initiates an authentication procedure to identify itself to the AP 110, for example, by sending an authentication request to the AP 110. The AP 110 responds by sending an authentication response back to STA1. Once the authentication procedure is complete, STA1 may associate with AP 110 to gain full access to the WLAN 120. Specifically, the STA1 may initiate the association procedure by sending an association request to the AP 110. The association request may include information such as the STA's SSID, supported data rates, capabilities, and the like. The AP 110 responds by sending an association response to STA1. The association response includes an association identifier (AID) for STA1, and may include other information such as the AP's SSID, supported data rates, capabilities, and the like.

The AP 110 may initiate a BA session, for example, by sending an ADDBA request to STA1. The ADDBA request may include information including, for example, aggregation buffer sizes, BA policies, status of the BA session, and so on. STA1 may accept the BA request by sending an ADDBA response having a status code set to "success." The BA session between STA1 and AP 110 is now active, and AP 110 may transmit aggregated data frames to STA1, and STA1 may confirm receipt of the aggregated data frames using a single block ACK frame.

When STA1 commences an SCO call via its Bluetooth transceiver 212 (or any other BT operation), its co-existence manager 213 may reduce interference on the BT audio signals resulting from concurrent transmission/reception of Wi-Fi signals by terminating the BA session. By terminating the BA session, the AP 110 may no longer transmit aggregated data frames to STA1, which in turn may reduce jitter in the BT audio signals resulting from interference by the Wi-Fi signals. More specifically, to terminate the BA session, STA1 transmits a DELBA request to the AP 110. The AP 110 responds by sending a DELBA response to STA1, and tears down the BA session. The BA session is terminated, and the AP 110 no longer sends aggregated data frames to STA1.

During the SCO call facilitated by STA1, the AP 110 may attempt to initiate new BA sessions with STA1 (e.g., the AP 110 may not know that STA1 is facilitating an SCO call and does not want to receive aggregated frames) by sending a number of DELBA requests to STA1 (only two are shown in FIG. 4 for simplicity). The STA1 declines the BA session requests by sending ADDBA responses including a status code set to "declined." After receiving a number of BA session declinations from STA1, the AP 110 stops attempting to initiate new BA sessions with STA1 (even after STA1 completes the SCO call).

Thus, when STA1 completes the SCO call and is ready to once again receive aggregated data frames from the AP 110, the AP 110 may no longer attempt to initiate a new BA session. Further, because current IEEE 802.11 standards do not provide a mechanism for STA1 to initiate a new BA session, the STA1 is no longer able to receive aggregated data frames or to acknowledge receipt of multiple data frames with a single block ACK frame. As a result, throughput between the AP 110 and STA1 may be relatively low (e.g., as compared with throughput during BA sessions).

In accordance with the present embodiments, STA1 may cause the AP 110 to restart or resume the BA session (e.g., after completion of an SCO call and/or other BT operation) by sending a frame including an instruction or trigger for the AP 110 to send another ADDBA request. The frame including the instruction or trigger may be any suitable frame including, for example, a DELBA frame with a reason code containing the instruction, a vendor specific action frame containing the instruction, an action frame having a vendor specific information element (VSIE) containing the instruction, or a probe request containing the instruction.

The AP 110 receives the frame including the instruction or trigger, and decodes instruction or trigger to determine that STA1 desires to restart or resume the BA session. In response thereto, the AP 110 may send an ADDBA request to STA1, which may accept the BA session request by sending an ADDBA response including a status code set to "success." In this manner, STA1 may use the AP 110 as a proxy to resume the BA session (which is consistent with current IEEE 802.11 standards). Allowing STA1 to instruct the AP 110 to resume the BA session is important because, for example, STA1 knows when the SCO call (or other BT operation) is complete, and therefore knows when it is able to resume receiving aggregated data frames. Otherwise, the AP 110 may have to repeatedly guess as to when the STA's BT operation is complete, and may eventually stop attempting to initiate or restore the BA session.

FIG. 5A is a sequence diagram 501 depicting an example suspension and resumption of a BA session in accordance with some embodiments. The sequence diagram 501 is described below with respect to a first wireless device (D1) and a second wireless device (D2). For one embodiment, device D1 may be a STA and device D2 may be an AP in an infrastructure mode wireless network (e.g., WLAN 120 of FIG. 1A). For another embodiment, device D1 may be a first STA and device D2 may be a second STA in an ad-hoc, P2P, or IBSS wireless network (e.g., P2P network 130 of FIG. 1B). For both embodiments, device D1 corresponds to a receiving device, and device D2 corresponds to a transmitting device.

Device D2 initiates a BA session by sending an ADDBA request to device D1. Device D1 accepts the BA request by sending an ADDBA response having a status code set to "success." The BA session between devices D1 and D2 is now active, and device D2 may transmit aggregated data frames to device D1.

When device D1 commences an SCO call via its Bluetooth transceiver 212 (or any other BT operation), device D1 may reduce interference on the BT audio signals by terminating the BA session so that device D2 does not transmit aggregated data frames to device D1. More specifically, device D1 transmits a DELBA request to device D2, which responds by sending a DELBA response to device D1 and tearing down the BA session. The BA session is terminated, and device D2 no longer sends aggregated frames to device D1. For at least some embodiments, device D2 may respond to the DELBA request from device D1 by suspending the BA session rather than terminating the BA session. When device D2 suspends the BA session, device D2 (and device D1) may maintain information corresponding to the BA session (e.g., TID values, BA policies, buffer sizes, lists of devices enabled for the BA session, and so on).

During the SCO call facilitated by device D1, device D2 may attempt to initiate new BA sessions with device D1 by sending a number of ADDBA requests to device D1 (only two are shown in FIG. 5A for simplicity). Device D1 declines the BA session requests by sending ADDBA responses including a status code set to "declined." After receiving a number of BA session declinations from device D1, device D1 stops attempting to initiate new BA sessions with device D1.

When the SCO call is completed, device D1 may desire to resume the BA session. Because device D1 may not, as a receiving device under current IEEE 802.11 standards, initiate the BA session, device D1 may send a frame including an instruction or trigger for device D2 to send another ADDBA request. The frame including the instruction or trigger may be any suitable frame including, for example, a DELBA frame with a reason code containing the instruction, a vendor specific action frame containing the instruction, an action frame having a vendor specific information element (VSIE) containing the instruction, or a probe request containing the instruction.

Device D2 receives the frame including the instruction or trigger, and decodes instruction or trigger to determine that device D1 desires to restart or resume the BA session. In response thereto, device D2 may send an ADDBA request to device D1, which accepts the BA session request by sending an ADDBA response including a status code set to "success." In this manner, device D1 may use device D2 as a proxy to resume the BA session.

FIG. 5B is a sequence diagram 502 depicting an example suspension and resumption of a BA session in accordance with other embodiments. The sequence diagram 502 is described below with respect to a first wireless device (D1) and a second wireless device (D2). For one embodiment, device D1 may be a STA and device D2 may be an AP in an infrastructure mode wireless network (e.g., WLAN 120 of FIG. 1A). For another embodiment, device D1 may be a first STA and device D2 may be a second STA in an ad-hoc, P2P, or IBSS wireless network (e.g., P2P network 130 of FIG. 1B). For both embodiments, device D1 corresponds to a receiving device, and device D2 corresponds to a transmitting device.

Device D2 initiates a BA session by sending an ADDBA request to device D1. Device D1 accepts the BA request by sending an ADDBA response having a status code set to "success." The BA session between devices D1 and D2 is now active, and device D2 may transmit aggregated data frames to device D1.

When device D1 commences an SCO call via its Bluetooth transceiver 212 (or any other BT operation), device D1 may reduce interference on the BT audio signals by suspending the BA session so that device D2 does not transmit aggregated data frames to device D1. More specifically, device D1 transmits an action frame to device D2, the action frame including an instruction for device D2 to suspend the BA session and stop frame aggregation. In response thereto, device D2 stops transmitting aggregated data frames, and suspends the BA session. For at least one embodiment, device D2 maintains the BA session information (e.g., TID values, BA policies, buffer sizes, lists of devices enabled for the BA session, and so on) while the BA session is suspended.

During the SCO call facilitated by device D1, device D2 does not attempt to initiate new BA sessions with device D1 because device D2 has suspended the BA session, thereby reducing network traffic associated with the transmission of ADDBA frames between devices D1 and D2 (e.g., as compared to the example embodiment of FIG. 5A) in an attempt to restart the BA session during the SCO call.

When the SCO call is completed, device D1 may desire to resume the BA session. Because D1 may not, as a receiving device under current IEEE 802.11 standards, initiate the BA session, device D1 may send an action frame including an instruction for device D2 to resume the BA session. In response thereto, device D2 resumes the transmission of aggregated data frames, and is therefore able to resume the BA session without having to send an ADDBA request to device D1. The ability to resume the BA session without exchanging ADDBA frames reduces network traffic associated with the transmission of ADDBA frames between devices D1 and D2 (e.g., as compared to the example embodiment of FIG. 5A).

FIG. 6 shows a flow chart 600 depicting an example operation in accordance with the present embodiments. Referring also to FIGS. 2, 5A, and 5B, a first wireless device (e.g., device D1 of FIGS. 5A-5B) and a second wireless device (e.g., device D2 of FIGS. 5A-5B) may initiate a BA session (601). The first wireless device may facilitate a Bluetooth operation while the BA session is active (602), and may suspend the BA session by sending a first frame to the second wireless device instructing the second wireless device to stop aggregating data frames (604). The first wireless device may end the Bluetooth operation after a period of time (606). The first wireless device may cause resumption of the BA session by sending a second frame to the second wireless device instructing the second wireless device to resume aggregating data frames (608). For some embodiments, the BA session information is maintained in the first wireless device and/or the second wireless device while the BA session is suspended (or terminated).

For some embodiments, the second frame instructs the second wireless device to send an ADDBA request to the first wireless device (608A). The first wireless device receives the ADDBA request (608B), and responds by sending an ADDBA response to the second wireless device (608C).

In the foregoing specification, the present embodiments have been described with reference to specific exemplary embodiments thereof. It will, however, be evident that various modifications and changes may be made thereto without departing from the broader scope of the disclosure as set forth in the appended claims. The specification and drawings are, accordingly, to be regarded in an illustrative sense rather than a restrictive sense.

What is claimed is:

1. A method for suspending and resuming block acknowledgment (BA) sessions between a first wireless device and a second wireless device in a wireless network, the method performed by the first wireless device and comprising:
    facilitating a Bluetooth operation while a BA session between the first and second wireless devices is active;
    suspending the BA session by sending a first frame to the second wireless device, the first frame instructing the second wireless device to stop aggregating data frames;
    ending the Bluetooth operation after a period of time; and
    resuming the BA session by sending a second frame to the second wireless device, the second frame instructing the second wireless device to resume transmission of aggregated data frames.

2. The method of claim 1, wherein the first frame comprises a delete block acknowledgment (DELBA) frame including a reason code that requests the second wireless device to suspend the BA session without deleting session information.

3. The method of claim 1, further comprising:
    maintaining session information, including one or more traffic identifier (TID) values and a block acknowledgement policy, while the BA session is suspended.

4. The method of claim 1, further comprising:
    declining all add block acknowledgment (ADDBA) requests from the second wireless device during the period of time that the Bluetooth operation is active.

5. The method of claim 1, wherein the second frame instructs the second wireless device to transmit an add block acknowledgment (ADDBA) request to the first wireless device, the ADDBA request to restart the BA session.

6. The method of claim 1, wherein the second frame comprises a delete block acknowledgment (DELBA) frame, an action frame, or a probe request.

7. The method of claim 1, wherein the Bluetooth operation comprises a Synchronous Connection Oriented (SCO) call to a wireless headset associated with the first wireless device.

8. A first wireless device, comprising:
a processor; and
a memory storing instructions that, when executed by the processor, cause the first wireless device to:
  facilitate a Bluetooth operation while a Wi-Fi block acknowledgement BA session between the first wireless device and a second wireless device is active;
  suspend the BA session by sending a first frame to the second wireless device, the first frame instructing the second wireless device to stop aggregating data frames;
  end the Bluetooth operation after a period of time; and
  resume the BA session by sending a second frame to the second wireless device, the second frame instructing the second wireless device to resume transmission of aggregated data frames.

9. The first wireless device of claim 8, wherein the first frame comprises a delete block acknowledgment (DELBA) frame including a reason code that requests the second wireless device to suspend the BA session without deleting session information.

10. The first wireless device of claim 8, further comprising:
maintaining session information, including one or more traffic identifier (TID) values and a block acknowledgement policy, while the BA session is suspended.

11. The first wireless device of claim 8, wherein execution of the instructions causes the first wireless device to:
declining all add block acknowledgment (ADDBA) requests from the second wireless device during the period of time that the Bluetooth operation is active.

12. The first wireless device of claim 8, wherein the second frame instructs the second wireless device to transmit an add block acknowledgment (ADDBA) request to the first wireless device, the ADDBA request to restart the BA session.

13. The first wireless device of claim 8, wherein the second frame comprises a delete block acknowledgment (DELBA) frame, an action frame, or a probe request.

14. The first wireless device of claim 8, wherein the Bluetooth operation comprises a Synchronous Connection Oriented (SCO) call to a wireless headset associated with the first wireless device.

15. A non-transitory computer-readable medium containing program instructions that, when executed by a processor of a first wireless device, causes the first wireless device perform operations comprising:
  facilitate a Bluetooth operation while a Wi-Fi block acknowledgement BA session between the first wireless device and a second wireless device is active;
  suspend the BA session by sending a first frame to the second wireless device, the first frame instructing the second wireless device to stop aggregating data frames;
  end the Bluetooth operation after a period of time; and
  resume the BA session by sending a second frame to the second wireless device, the second frame instructing the second wireless device to transmission of aggregated data frames.

16. The non-transitory computer-readable medium of claim 15, wherein the first frame comprises a delete block acknowledgment (DELBA) frame including a reason code that requests the second wireless device to suspend the BA session without deleting session information.

17. The non-transitory computer-readable medium of claim 15, wherein execution of the instructions causes the first wireless device to:
maintain session information, including one or more traffic identifier (TID) values and a block acknowledgement policy, while the BA session is suspended.

18. The non-transitory computer-readable medium of claim 15, wherein execution of the instructions causes the first wireless device to:
decline all add block acknowledgment (ADDBA) requests from the second wireless device during the period of time that the Bluetooth operation is active.

19. The non-transitory computer-readable medium of claim 15, wherein the second frame instructs the second wireless device to transmit an add block acknowledgment (ADDBA) request to the first wireless device, the ADDBA request to restart the BA session.

20. The non-transitory computer-readable medium of claim 15, wherein the second frame comprises a delete block acknowledgment (DELBA) frame, an action frame, or a probe request.

* * * * *